March 10, 1925.
D. H. SCHALL
VEHICLE BRAKE
Filed Oct. 15, 1923
1,529,377
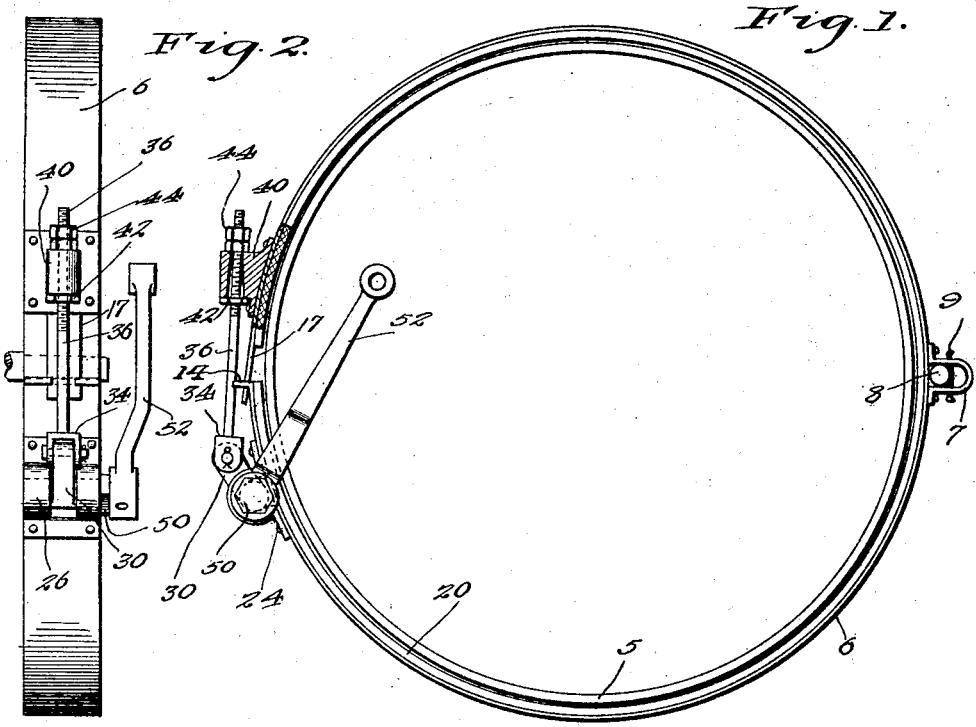
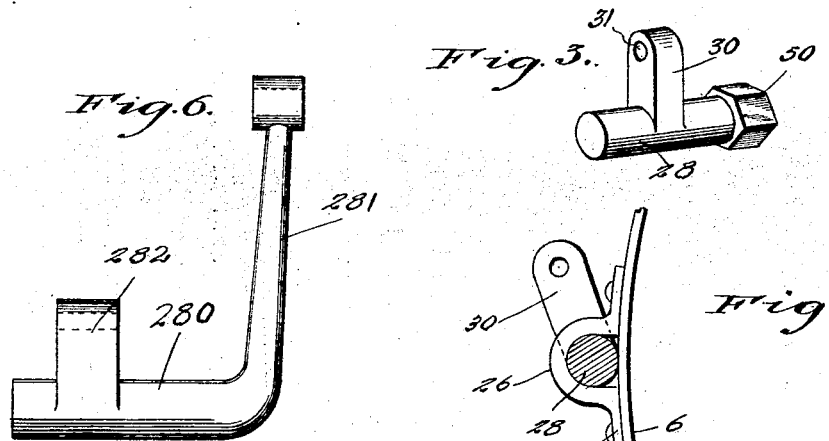
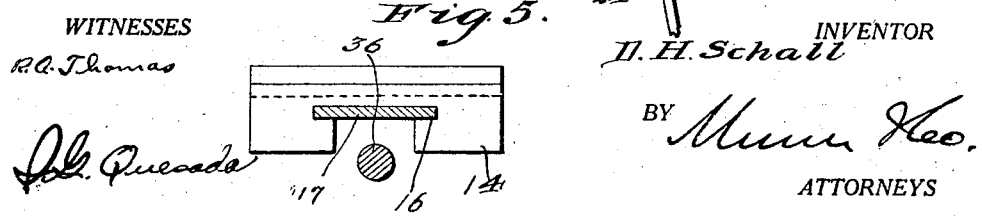
WITNESSES
R. A. Thomas
INVENTOR
D. H. Schall
BY
ATTORNEYS Patented Mar. 10, 1925.

1,529,377

UNITED STATES PATENT OFFICE.

DAVID HEILMAN SCHALL, OF CANTON, OHIO.

VEHICLE BRAKE.

Application filed October 15, 1923. Serial No. 668,638.

*To all whom it may concern:*

Be it known that I, DAVID HEILMAN SCHALL, a citizen of the United States, and resident of Canton, in the county of Stark and State of Ohio, have invented certain new and useful Improvements in Vehicle Brakes, of which the following is a specification.

This invention relates to brakes especially adapted for use on automobiles.

Briefly stated an important object is to provide an external brake having simple and reliable means whereby the same may be operated from a remote point for uniformly applying the brake.

A further object is to provide a brake having means whereby the ends of the band are held in alignment and whereby the diameter of the band may be decreased for engaging the band tightly with the drum.

A further object is to provide a brake which is of highly simplified construction, durable in use and cheap to manufacture.

Other objects and advantages will be apparent during the course of the following description.

In the accompanying drawing forming a part of this application and in which like numerals are employed to designate like parts throughout the same, Figure 1 is a side elevation of the improved brake, parts being shown in section.

Figure 2 is an edge elevation of the brake.

Figure 3 is a perspective of a shaft embodied in the invention.

Figure 4 is a detail sectional view illustrating the manner of supporting the shaft illustrated in Figure 3.

Figure 5 is a detail horizontal sectional view illustrating the means for maintaining the ends of the band in alignment.

Figure 6 is an elevation of a slightly modified form of operating shaft and crank.

In the drawing wherein for the purpose of illustration is shown a preferred embodiment of the invention the numeral 5 designates a brake drum about which a band 6 is extended and the band 6 is provided intermediate its ends with a U-shaped attaching member 7 which freely receives a holding pin 8. Figure 1 illustrates that a yieldable member 9 is extended through the sides of the U-shaped attaching member 7 and bears against the pin 8 so as to hold the band in the proper position with relation to the drum.

One end portion of the band 6 is extended outwardly and bifurcated to provide a pair of lugs 14. As illustrated in Figure 5 the lugs 14 have their inner sides formed with notches 16 for the reception of the reduced terminal portion 17 of the band. It will be seen that the reduced terminal portion 17 is not only held against lateral movement and consequently the ends of the band are maintained in alignment. It might be stated that the portion 17 extends beyond the major portion of the band and the adjacent end of the brake lining 20 so as to be free to pass through the notches 16.

In carrying out the invention a bearing plate 24 is riveted or otherwise secured to one end portion of the band 6 and is provided with aligned bearing members 26 for the reception of a short shaft 28.

The intermediate portion of the operating shaft 28 is formed with a radial arm 30 apertured as indicated at 31 for the reception of a pin extended through the U-shaped head 34 of the rod 36.

The upper portion of the rod 36 is threaded and extended through a boss 40 on the other terminal portion of the band and holding nuts 42 and 44 are threaded on the rods 36 on opposite sides of the boss 40 so as to securely hold the same in position. The members 44 are two in number and of course the outermost member constitutes a locking means. Figure 1 illustrates that the opening in the boss 40 is tapered toward its upper end so as to allow a free movement of the rod incident to the expansion and contraction of the brake band.

The shaft 28 may be squared as indicated at 50 and a crank 52 is secured thereto in any suitable manner. Of course the crank 52 is connected to an operating mechanism such as a foot pedal or a lever at a remote point.

In the form of the invention illustrated in Figure 6 the shaft 280 is integral with the crank 281 and the arm 282 is also integral with the shaft.

With reference to the foregoing description taken in connection with the accompanying drawings it will be seen that a brake constructed in accordance with this invention may be economically applied and the lining will not wear rapidly in any one place as the spacing mechanism indicated by the numerals 7, 8 and 9 will maintain the lining a proper distance from the drum and in any case will not permit the lining to bear hard against the drum and wear rapidly.

When the crank 52 is operated from a remote point the band is securely engaged with the drum so as to bring the vehicle to an early but gradual stop. By providing a means whereby the brakes are uniformly applied skidding is overcome to a large measure.

Particular attention is directed to the fact that in applying the improved brake band to a brake drum the band is first positioned about the drum and the perfectly straight reduced extension 17 is then extended through the notches 16 in the opposed sides of the radially disposed lugs 14. In other words, the band may be applied to the drum while in an open or expanded position and then substantially contracted so as to occupy an operative position as illustrated in Figure 1.

Having thus described the invention, what is claimed is:—

1. A brake comprising a band having one end provided with a reduced extension, and the other end of the band being extended outwardly in a radial direction and bifurcated to provide a pair of laterally spaced lugs, the inner sides of which are formed with notches to receive and guide the reduced extension of the other end of the band.

2. A brake comprising a band having one end provided with a reduced extension, and the other end of the band being extended outwardly and bifurcated to provide a pair of lugs, the inner sides of which are formed with notches to receive the extension of the other end of the band, a bearing member secured to said band and having spaced aligned shaft receiving members, a shaft received in said members and having a radial arm, a boss secured to one end of said band and portion having an opening, and a rod pivotally connected to said arm and extended through the opening in said boss.

3. A brake comprising a band having one end provided with a reduced extension, and the other end of the band being extended outwardly and bifurcated to provide a pair of lugs, the inner sides of which are formed with notches to receive the extension of the other end of the band, a bearing member secured to said band and having spaced aligned shaft receiving members, a shaft received in said members and having a radial arm, a boss secured to one end of said band and having an opening, a rod pivotally connected to said arm and extended through the opening in said boss, and nuts threaded on said rod and engaging opposite sides of said boss.

4. A brake comprising a band having one end provided with laterally spaced radially projecting spaced lugs, the inner sides of which are formed with notches and the other end of the band being reduced to define an extension slidably received in said notches whereby one end of the band is held against lateral movement with respect to the other band.

5. A brake comprising a band having one end provided with laterally spaced outwardly projecting spaced lugs, the inner sides of which are formed with notches and the other end of the band being reduced to define an extension slidably received in and guided by said notches whereby one end of the band is held against lateral movement with respect to the other band, and means whereby to operate the band.

DAVID HEILMAN SCHALL.